(12) United States Patent
Aalto et al.

(10) Patent No.: US 6,712,965 B1
(45) Date of Patent: Mar. 30, 2004

(54) PURIFYING DEVICE FOR LIQUID

(75) Inventors: Kari Aalto, Tampere (FI); Valery Antipov, Simferopol (UA); Alexander Melnikov, Simferopol (UA)

(73) Assignee: Aalto Filtration Oy (FI)

( * ) Notice: Subject to any disclaimer, the term of this patent is extended or adjusted under 35 U.S.C. 154(b) by 0 days.

(21) Appl. No.: 09/857,840

(22) PCT Filed: Nov. 16, 1999

(86) PCT No.: PCT/FI99/00947
§ 371 (c)(1),
(2), (4) Date: Jun. 11, 2001

(87) PCT Pub. No.: WO00/33937
PCT Pub. Date: Jun. 15, 2000

(30) Foreign Application Priority Data

Dec. 10, 1998 (FI) .................................................. 982673

(51) Int. Cl.⁷ .............................................. B01D 27/14
(52) U.S. Cl. ...................... 210/266; 210/282; 210/315; 210/489; 210/497.01; 210/502.1; 210/506
(58) Field of Search ................................ 210/266, 282, 210/437, 443, 483, 497.01, 502.1, 506 510.1, 295, 314, 315, 489

(56) References Cited

U.S. PATENT DOCUMENTS 3,327,859 A * 6/1967 Pall ............................ 210/266
4,828,698 A * 5/1989 Jewell et al. ................ 210/266
5,160,038 A 11/1992 Harada et al. .............. 210/149
6,183,647 B1 2/2001 Aalto et al. ................. 210/636
6,312,609 B1 * 11/2001 Solyanik et al. ............ 210/767

FOREIGN PATENT DOCUMENTS

| EP | 0 236 071 A2 | 9/1987 |
| WO | WO 96/08446 | 3/1996 |
| WO | WO 98/29176 | * 7/1998 |

* cited by examiner

Primary Examiner—Ivars Cintins
(74) Attorney, Agent, or Firm—Connolly Bove Lodge & Hutz LLP

(57) ABSTRACT

The invention relates to a purifying device for liquid, that has filtering means (1) in order to separate impurities in the liquid to be treated by mechanical filtration and purifying means (2), such as an activated carbon element or like, in order to eliminate impurities in the liquid to be treated by absorption or correspondingly, which means (1, 2) are arranged essentially built-in therein. The mechanical filtering means (1) are carried out by a thin filtering film (1a) made of plastic based material, such as PTM (Particle Track Membrane), TeM (Track-edge Membrane) or like, the porosity of which is 5–15%, the thickness preferably 10–25 $\mu$m and the size of pores 0,5 $\mu$m at its height.

11 Claims, 5 Drawing Sheets

PURIFYING DEVICE FOR LIQUID

REFERENCE TO RELATED APPLICATION

Figure 1:
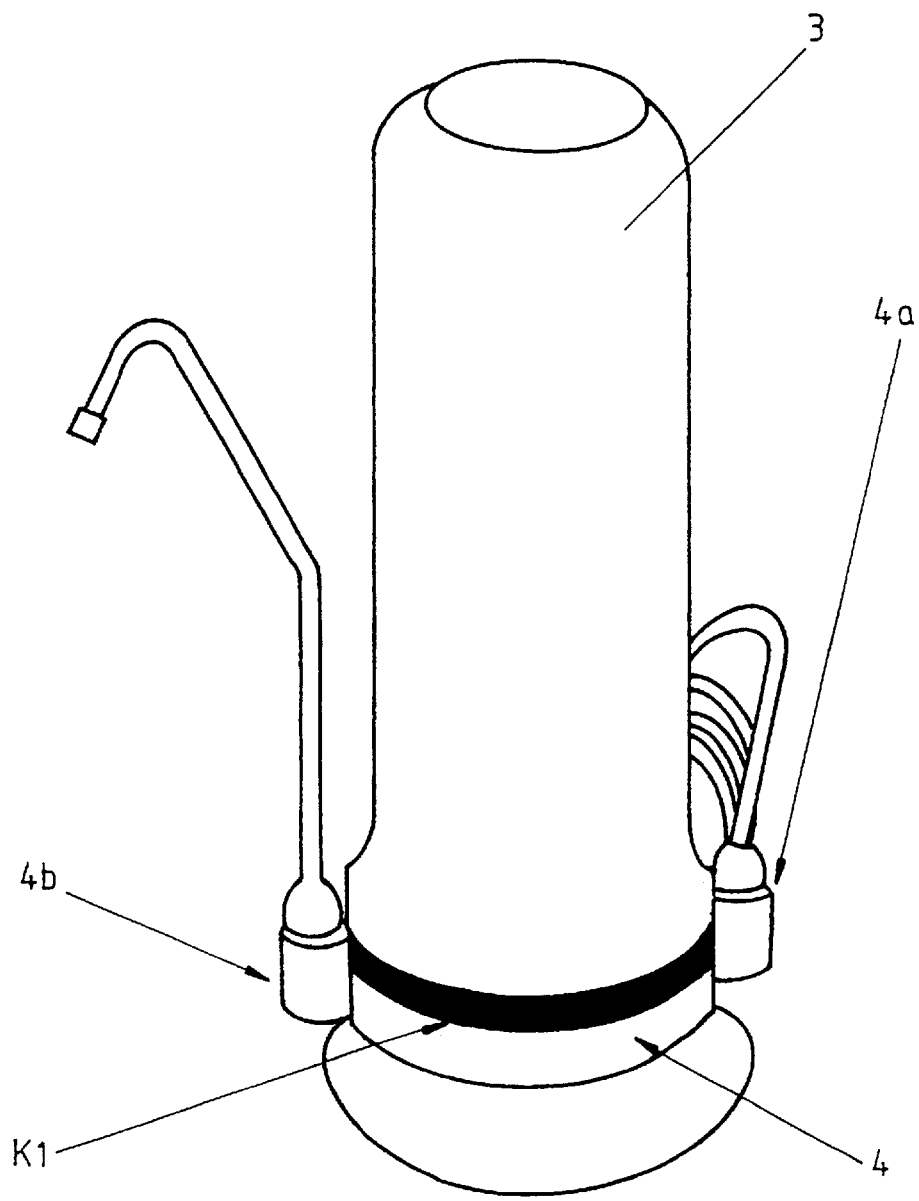

This Application is a 371 of PCT/FI99/00947, filed Jun. 15, 2000, which claims the priority of FI 982673, filed Dec. 10, 1998.

The invention relates to a purifying device for liquid, that has filtering means in order to separate impurities in the liquid to be treated by mechanical filtration and purifying means, such as an activated carbon element or like, in order to eliminate impurities in the liquid to be treated by absorbtion or correspondingly, which means are arranged essentially built-in therein.

The type of purifying devices for liquid as described above, such as water purifiers are being used nowadays, in which a ceramic filter has been used as the filtering means and furthermore activated carbon material inside the ceramic filter acting as the purifying means.

The operating of the type of structure described above is inadequate considering particularly bacteria protection, because bacteria existing in the liquid to be treated, such as e.g. in dirty water, may not be eliminated hundred-procent by a ceramic filter with reasonable costs, but instead a part of the bacteria may penetrate the whole structure. This is why water, that is filtered by the type of structure in question, may not be exploited under all circumstances. Furthermore one disadvantage of ceramic material is such, that the ceramic filtering material absorbs substances existing in the water to be treated, such as humus or like, which is why it first of all gets dyed thoroughly and on the other hand naturally lets a large quantity of fine-grained humus through the same. When using this type of solution, one may not under all circumstances have full certainty, whether the water that has been treated is totally safe for drinking, that is why it is safest to avoid use of the type of purifying device described above under particularly disadvantageous circumstances.

On the other hand in the Finnish Patent, number 98810 there has been presented a type of a water purification device, that differs from what has been described above and that has a so called Membrane-structured filtering part. The solution in question is meant to operate on so called syphon principle, thanks to which the structure of the same is very simple. The water purification device in question is very safe and easy to use in practice, because the quality of the water flowing to the collecting point, taking place thanks to the syphon phenomenon self-powered and continuously, is always homogeneous regardless of the operating time of the device. This is first of all due to the fact, that a water purification device equipped with a thin PTM- or TeM filtering film does not at any stage let through material parts exceeding a certain particle size, in which case, when the filtering film gets dirty, only the penetration speed of the filter decreases and may even totally be interrupted, in case the filtering film is not cleaned every now and then.

The type of device described above is very easy to use in most heterogeneous connections, e.g. for filtering of lake water on terrain or under other circumstances as well, in which actual tap water may not be exploited. A disadvantage of the device in question is mainly the slowness of its filtering speed and on the other hand also the fact, that e.g. in ordinary household use the device requires use of separate vessels, so that the syphon phenomenon may be carried out.

Furthermore in the Finnish Patent Application, number 965249, "Method and apparatus for treatment of liquid" there has been presented a more developed solution with respect to the above, in which the filtering film is being cleaned by means of cleaning means essentially self-powered, whereby first of all the primary side of the filtering film is being flushed by means of a by-pass flow of the liquid to be treated taking place advantageously tangentially. The solution in question has furthermore such a characteristic, that for cleaning of the filtering film a so called inverse flow is being exploited, that is carried out by leading liquid, that has been treated, such as e.g. filtered water, from an intermediate storing space, that has been connected to the secondary side of the filters, as a flow-through, that takes place through the filtering means in opposite direction with respect to the filtration flow.

Thanks to the solution above, that may be exploited first of all by connecting the same directly to a pressurized water system, the filtering film may be cleaned in an extremely simple, quick and reliable way. In addition to that one crucial advantage of the arrangement above is also the fact, that there is not any more need for manual cleaning measures of the filtering film, that is why direct mechanical rubbing of the filtering film may not occur.

The type of developed Membrane-structures described above are not however completely developed in view of all parts of the same. Thus when it is among other things desired to absorb substances of water simultaneously when the same is being filtered, in this connection e.g. totally separate activated carbon filters must have been used, that have been coupled so to say in series with the Membrane-film. This has naturally such a consequence, that a water purifying device equipped e.g. with an activated carbon filter being carried out traditionally as described above, brings out a disproportionately complicated and large entirety.

It is the aim of the purifying device for liquid according to this invention to achieve a decisive improvement over the prior art in order to address the problems presented above. In order to carry out this aim, the mechanical filtering means include a thin filtering film 1a made of plastic based material, such as PTM (Particle Track Membrane), TeM (Track-edge Membrane) or the like, the porosity of which is 5–15%, the thickness of which is preferably 10–25 $\mu$m and having a pore size of 0.5 $\mu$m at its height.

The purifying device for liquid according to the invention offers a very simple and at the same time however also an extremely safe entirety, by means of which it is possible simultaneously with the mechanical filtration to carry out also a safe treatment of the liquid to be treated, such as of drinking water, in order to e.g. absorb the harmful substances existing therein by activated carbon. One significant advantage of the invention is also the fact, that an efficient pre-filtration before e.g. an activated carbon material increases the operating time of the activated carbon material manyfold. In addition to that, a thin film material enables as large quantity of activated carbon as possible, in which case also the operating conditions for the same are optimal. So, the purifying device for liquid according to the invention is structurally very simple, because the structure inside the Membrane-film, that is formed advantageously of a fixed activated carbon cylinder, while doing its own primary functioning also supports the Membrane-film, so that there is no need anymore for use of a separate support structure for the Membrane-film in this connection. On the other hand the existing activated carbon solutions, that are internal e.g. within ceramic material are based on grain-like carbon, which is not able to operate as reliably as a totally homogeneous fixed cylinder, through which water is "forced". In this connection thanks to an elongated pipe structure being exploited with the purifying device for liquid it is possible to take advantage of those other parts of already existing water purifying device structures, into which a water filtering cartridge, that is carried out according to the invention, may be installed on quickrelease principle, such as by a screw joint, clamp joint, bayonet joint and/or correspondingly. In this connection the Membrane-film is arranged advantageously furthermore as a strenghtened structure by using a suitable strenghtening layer, that is connected in connection with the same e.g. by lamination.

As a summary of the advantages of the purifying device for liquid according to the invention, technical reliability and safety of its use may be mentioned, because the uniform plane structure of the filtering film being exploited therewith as well as those essentially cylindrical holes of the film enable first of all cleaning of the filtering film without the risk of the film getting damaged. In addition to that the cylindrical holes make sure of the reliable operating of the filtering film particularly in view of prevention of e.g. bacteria penetration, because the size of pores is at each point of the filtering film always within allowed limits at its height.

The non-independent claims related to the purifying device for liquid set forth preferred embodiments of the purifying device for liquid according to the invention.

Figure 2:
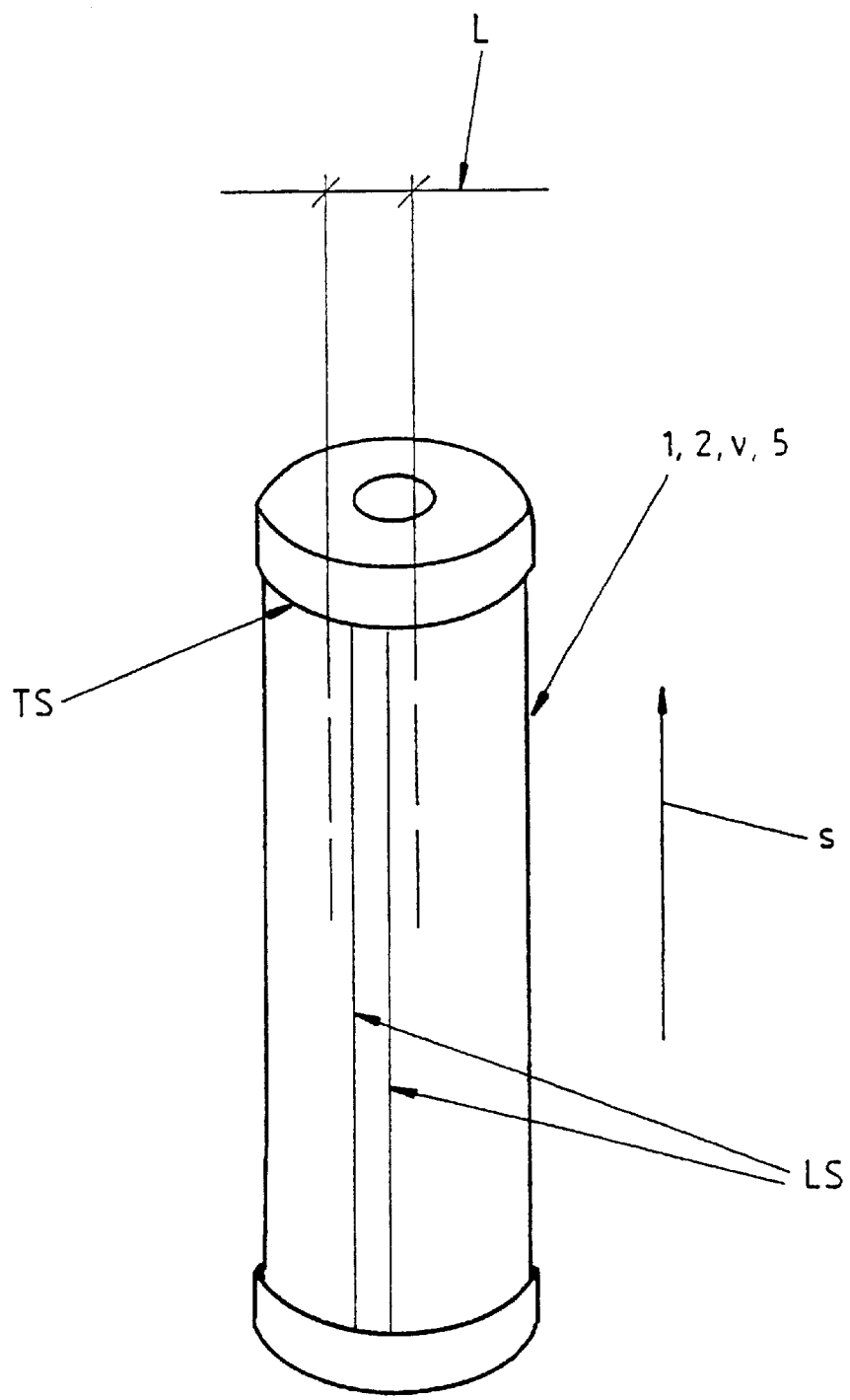
Figure 3:
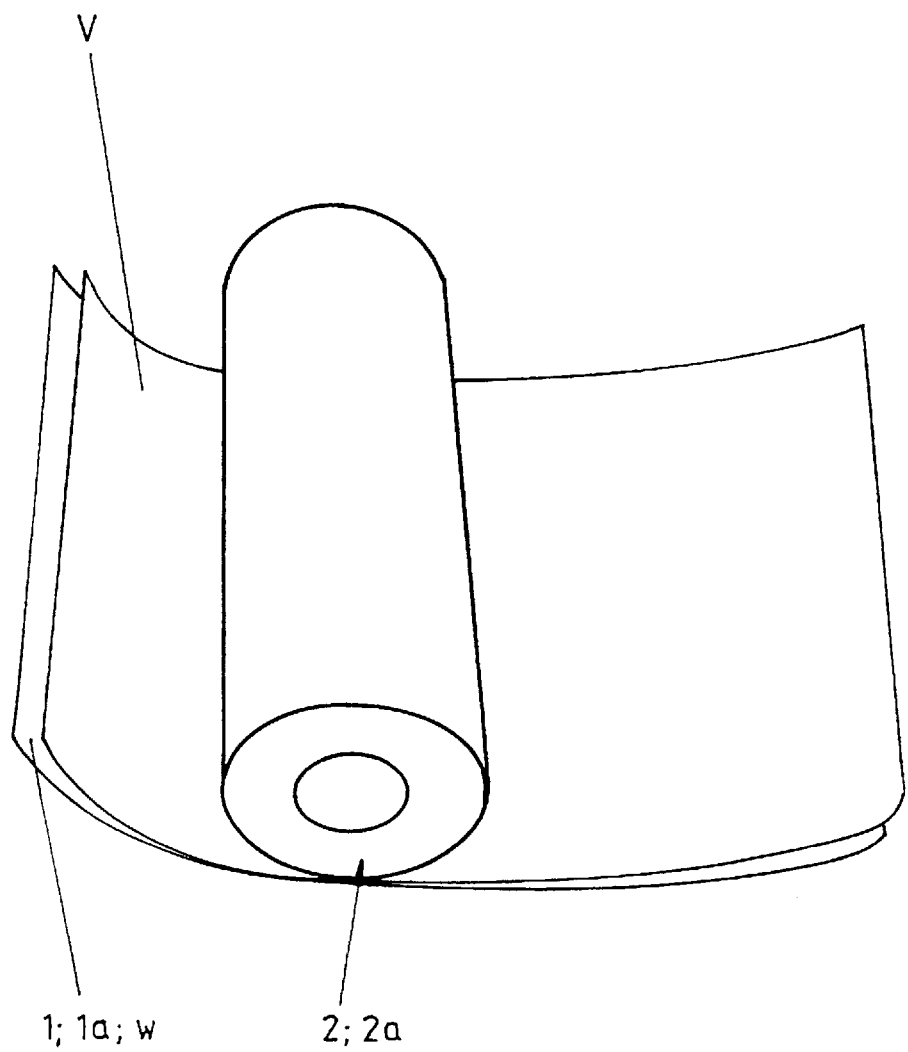
Figure 4A:
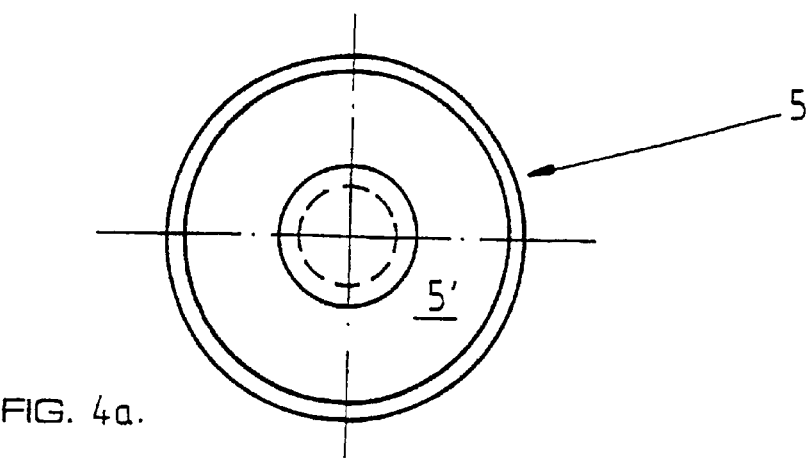
Figure 4B:
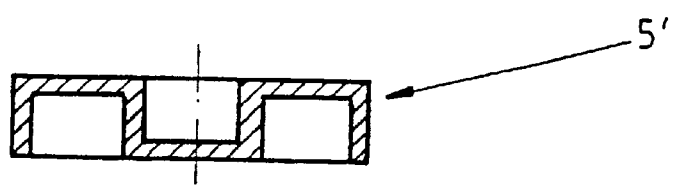
Figure 4C:
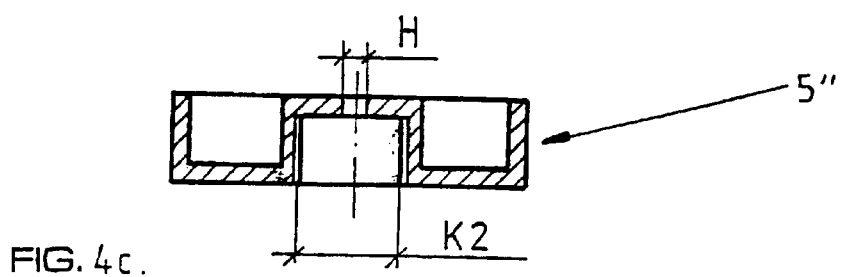
Figure 4D:
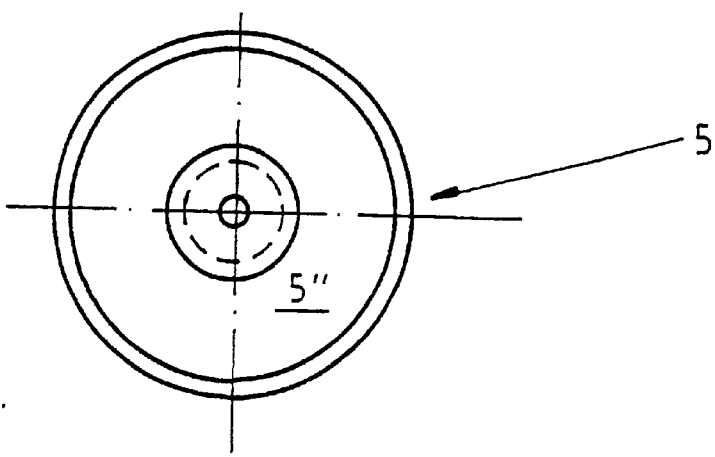
Figure 5A:
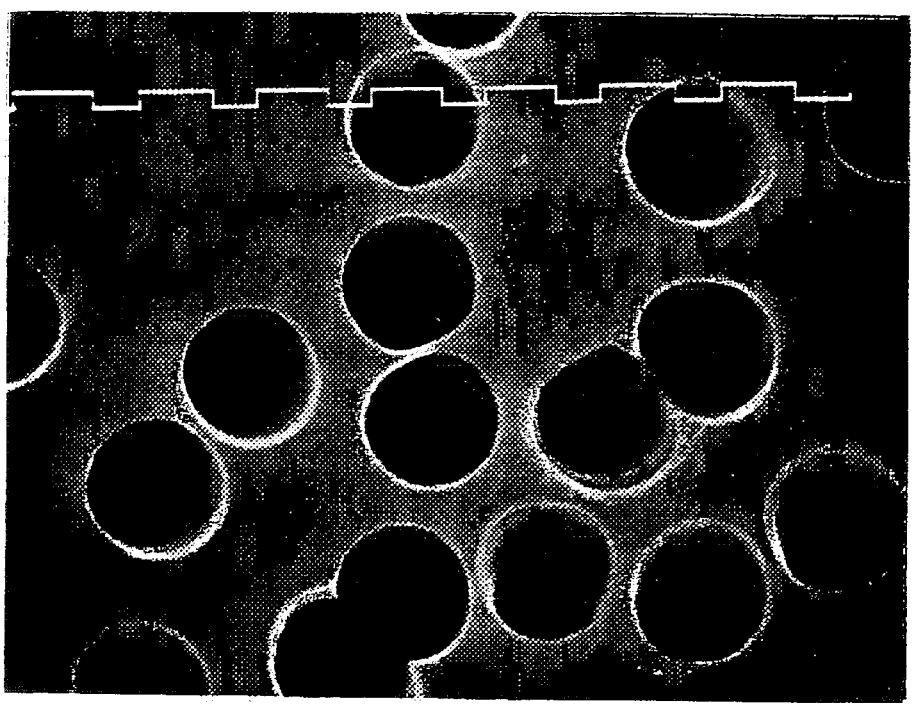
Figure 5B:
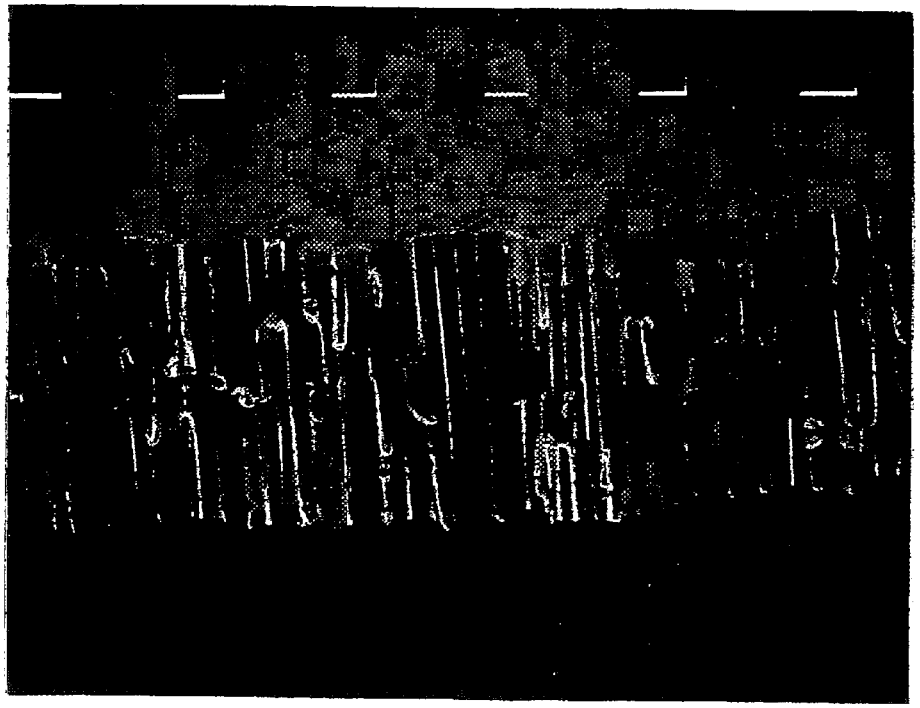

The invention will now be described in detail with reference to the accompanying drawings, in which FIG. 1 shows a perspective view of an advantageous purifying device entirety for liquid according to the invention, FIG. 2 shows a perspective view of an advantageous combination of the filtering means and the purifying means as a cylindrical cartridge filter solution, FIG. 3 shows a part of the structure shown in FIG. 2 being opened, FIG. 4 shows the end parts belonging to the entirety shown in FIG. 2 as seen from the middle (FIGS. 4a and 4d) and as a cross section (FIGS. 4b and 4c), and FIGS. 5a and 5b show a front view and a cross sectional perspective view of enlarged photos, that are made with differing enlargements, representing a typical PTM/TeM filtering film being exploited with the purifying device for water.

The invention relates to a purifying device for liquid. The purifying device has filtering means 1 for separating impurities in the liquid, and mechanical filtration and purifying means 2, such as an activated carbon element for eliminating impurities in the liquid via absorption. The mechanical filtering means 1 include a thin filtering film 1a made of plastic based material, such as PTM (Particle Track Membrane), TeM (Track-edge Membrane) or the like, the porosity of which is 5–15%, the thickness of which is preferably 10–25 $\mu$m and having a pore size of 0.5 $\mu$m at its height.

In an advantageous embodiment, the filtering film 1a is, as shown by way of example in FIGS. 3 or 5a and 5b, a uniform plane-structure. The filtering film 1a is rendered porous by essentially cylindrical holes existing therein. FIGS. 5a and 5b show a front view and a cross sectional perspective view of enlarged photos, that are made with differing enlargements, representing a typical PTM/TeM filtering film 1a, that is manuactured by irradiating and etching a raw film sheet. By using the type of filtering film 1a described above, the pressure loss caused by the filtering means may be efficiently minimized. Thus, the purifying device for water according to the invention is suitable for use as a drinking water purifier that is easy to use and reliable under most heterogeneous circumstances including ordinary household use and use under extremely difficult circumstances. In addition, the purifying device according to the invention is decidedly better than a ceramic purifier, for example, with respect to flow-through and the pressure loss caused by the purifying device. The manufacturing costs of ceramic purifiers are also many times the manufacturing costs of the purifying device according to the invention. From a technical point of view, it is also clear that a porosity between the limits of 5–15% described above may not be achieved by a ceramic filtering material, because the porosity of ceramic material is always 30–95% in practice. Because ceramic structure is non-homogeneous, reliable operation of the filter may not be obtained in ceramic purifiers, particularly with respect to bacteria filtration. When a filtering film made of plastic based material is used, it is possible to make sure that the size of pores is exactly, for example 0.5 $\mu$m at its height.

As an advantageous embodiment, the filtering film 1a of the filtering means 1, such as PTM, TeM or the like is strengthened by means of a strengthening layer w disposed in connection with the filtering film 1a. The strengthening layer w is advantageously made of non-woven material. Furthermore, according to an advantageous embodiment, the strengthening layer w is formed integrally with the filtering film 1a, such as by lamination on at least one side surface of the filtering film 1a. Further according to an advantageous embodiment, the size of pores in the filtering film 1a is 0.1–0.6 $\mu$m, wherein the pore density of the filtering film 1a is $5 \times 10^9$–$5 \times 10^7$ pores/cm$^2$. In addition to the above, it is naturally advantageous to provide the activated carbon cylinder 2a with a separate intermediate film V as shown, for example, in FIG. 3, in order to fade its black color.

As a particularly advantageous embodiment in practice, a plastic based material, such as polyethylene, polyprophylene and/or like, the specific weight of which is 30–300 g/m$^2$, advantageously 150–200 g/m$^2$, is being used as the strenghtening material w of the filtering film 1a.

In the embodiment shown particularly in FIG. 1, the invention has been applied in connection with a water filter, the filtering and purifying means 1, 2 of which are arranged as a filtering cartridge or like to be placed inside a cover part 3, that is furthermore attached to a frame part 4 of the treating device for liquid advantageousely removably, such as by means of a bayonet joint, screw joint K1 and/or correspondingly. Moreover the filtering cartridge is to be attached advantageousely on quick-release principle, such as by a clamp joint, bayonet joint, screw joint K2 and/or correspondingly to the frame part 4, which has at least a feed flow fitting 4a and an exhaust flow fitting 4b in order to lead water through the same to the purifying device for liquid as well as away from the same. As shown in FIGS. 2 and 3, the purifying means 2 in the form of an elongated pipe structure, such as an essentially fixed and at least partly hollow activated carbon cylinder 2a or like, is coated hermetically at least by the surfaces being in contact with the unclean liquid, preferably by its casing part, by means of a plastic based filtering film 1a. In the embodiment represented above, the strenghtening layer w is arranged naturally on that side of the filtering film 1a, that is adjacent to the activated carbon cylinder 2a.

Furthermore with reference to the above FIGS. 2 and 3, the activated carbon cylinder 2a, that is arranged as an essentially elongated pipe-structure, and the filtering film 1a surrounding the above are connected by the end-edges of the same by end parts 5, that close hermetically the end-edges of the filtering film 1a against the outer surface of the activated carbon cylinder 2a. In the embodiment shown in FIG. 4, the end part 5' placed above is a so called plug, whereby the end part 5" placed underneath the above is for its part provided with a hole H in order to enable flow through the filtering cartridge. Furthermore as shown in FIG. 2, the filtering film 1a is fastened in place around the activated carbon cylinder 2a by means of a lap-joint L being formed of the opposite ends of the same, that has advantageously two or several binding joints LS, such as hot-sealing joints or like placed in the longitudinal direction s of the activated carbon cylinder 2a. In this connection it is advantageous to place a sealing joint TS also to the edges of the end parts 5 by using e.g. food staff glue or like.

It is obvious, that the invention is not limited to the embodiments presented or described above, but instead it can be modified to a great extent within the basic idea. So it is in principle possible to carry out the construction of the purifying device for liquid according to the invention in very many ways, e.g. according to prior techniques also by exploiting planar structures. It is on the other hand possible to exploit also the type of solutions shown in the drawings otherwise, e.g. when using e.g. grain-like activated carbon, in which case it must be naturally supported in place by using a separate intermediate frame. In this way it may be even possible to carry out a purifying device for liquid, in which only the activated carbon material may be changed by providing the type of intermediate frame with an openable end or correspondingly. Naturally the type of end parts shown in FIG. 4 may be carried out for the part of the sealings and joints in most heterogeneous ways.

What is claimed is:

1. A purifying device for liquid comprising:
   a housing having a top wall, a bottom wall, a generally cylindrical side wall, and an inlet and an outlet defining a fluid flow path between the inlet and the outlet;
   liquid filtration means disposed in said housing between said inlet and outlet and in said fluid flow path, wherein said filtration means comprise:
      an activated carbon cylinder having an axial lumen defined therein, and
      a film made of a plastic based membrane filter material, said film covering the outer surface of said carbon cylinder, wherein a strengthening layer is laminated to at least one side surface of said film, and wherein said flow path directs a fluid flow sequentially through said membrane then radially through said carbon cylinder to said lumen.

2. The purifying device according to claim 1, wherein the film is a uniform plane structure, a porosity of which is provided by essentially cylindrical holes existing therein, wherein said film has a porosity of 5–15%, a thickness 10–25 $\mu$m and a maximum pore size of 0.5 $\mu$m.

3. The purifying device according to claim 1, wherein said membrane filter material has pores of 0.1–0.6 $\mu$m in size, and wherein the pore density of said membrane filter material is $5\times10^9$–$5\times10^7$ pores/cm$^2$.

4. The purifying device according to claim 1, wherein said strengthening layer comprises a plastic based material having a specific weight of 30–300 g/m$^2$.

5. The purifying device according to claim 1, wherein the strengthening layer is arranged on a side of the film that is adjacent to the activated carbon cylinder.

6. The purifying device according to claim 1, wherein said filtration means are constructed as a cartridge, wherein said activated carbon cylinder is arranged as an essentially elongated pipe-structure, and wherein said film surrounds said cylinder and is fastened in place by a sealed, longitudinal lap-joint, and wherein said cartridge further comprises end-caps that fit over and hermetically seal end-edges of said cylinder and said film.

7. The purifying device according to claim 6, wherein said housing includes:
   a first engagement means; and
   a frame portion comprising:
      a second engagement means disposed to removeably engage said first engagement means, and
      quick release means for releaseably attaching said filtration means.

8. The purifying device according to claim 1, wherein said film has been irradiated and etched.

9. The purifying device according to claim 1, wherein said strengthening layer comprise a non-woven fibrous polymer.

10. The purifying device according to claim 1, wherein said strengthening layer comprises a plastic based material selected from the group consisting of polyethylene and polyprophylene and having a specific weight of 30–300 g/m$^2$.

11. The purifying device according to claim 1, wherein said strengthening layer comprises a plastic based material selected from the group consisting of polyethylene and polylpropylene and having a specific weight of 150–200 g/m$^2$.

* * * * *